United States Patent
Chen et al.

(10) Patent No.: US 11,565,762 B2
(45) Date of Patent: Jan. 31, 2023

(54) ZERO MOMENT POINT JITTER PROCESSING METHOD AND APPARATUS AND ROBOT USING THE SAME

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Xianwei Su, Shenzhen (CN); Zheng Xie, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 572 days.

(21) Appl. No.: 16/724,413

(22) Filed: Dec. 23, 2019

(65) Prior Publication Data
US 2021/0107577 A1 Apr. 15, 2021

(30) Foreign Application Priority Data
Oct. 14, 2019 (CN) .......................... 201910971974.7

(51) Int. Cl.
*B62D 57/02* (2006.01)
*G01L 5/16* (2020.01)

(52) U.S. Cl.
CPC ................ *B62D 57/02* (2013.01); *G01L 5/16* (2013.01)

(58) Field of Classification Search
CPC .......... B62D 57/02; G01L 5/16; B25J 9/1602; B25J 9/161; B25J 9/1628; B25J 11/00
See application file for complete search history.

(56) References Cited

FOREIGN PATENT DOCUMENTS

| CN | 101329206 A | 12/2008 |
|---|---|---|
| CN | 105973143 A | 9/2016 |
| CN | 109605364 A | 4/2019 |

*Primary Examiner* — Robert G Bachner

(57) ABSTRACT

The present disclosure provides a zero moment point jitter processing method as well as an apparatus and a robot using the same. The method includes: obtaining left foot force information and right foot force information collected by sensors; calculating a first zero moment point and a second zero moment point of soles of two feet of a robot based on the left foot force information and the right foot force information; calculating a third zero moment point of the robot according to the first zero moment point and the second zero moment point; calculating a jitter amplitude of the third zero moment point within a preset period; and adjusting a position of the third zero moment point in response to the jitter amplitude being not larger than a predetermined jitter amplitude threshold. In this manner, the robot can eliminate zero moment point jitters within a certain amplitude.

15 Claims, 8 Drawing Sheets

ZERO MOMENT POINT JITTER PROCESSING METHOD AND APPARATUS AND ROBOT USING THE SAME

CROSS REFERENCE TO RELATED APPLICATIONS

This application claims priority to Chinese Patent Application No. 201910971974.7, filed Oct. 14, 2019, which is hereby incorporated by reference herein as if set forth in its entirety.

BACKGROUND

1. Technical Field

The present disclosure relates to robot technology, and particularly to a zero moment point jitter processing method as well as an apparatus and a robot using the same.

2. Description of Related Art

A biped robot is actually an integrative platform which involves multiple science fields including mechanical technology, electronic technology, control technology, computing technology, sensing technology, artificial intelligence, bionics, and the like. Compared with other legged robots, biped robots are more suitable for co-working with humans in the environments of human's living or working. In order to make the biped robots to adapt to the environments to serve human beings in a better manner, the biped robots need to have a stable balance system.

During the movement of a robot such as standing and walking, the vibration of the robot system may cause the jittering of the position of the zero moment point, and then further affect the stability of the robot.

It should be noted that, the information disclosed in the description of related art is only for facilitating the understanding of the background of the present disclosure, and therefore may include information other than the prior art known to those skill in the art.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second". "third", and the like in the descriptions are only used for distinguishing, and cannot be understood as indicating or implying relative importance.

Figure 1:
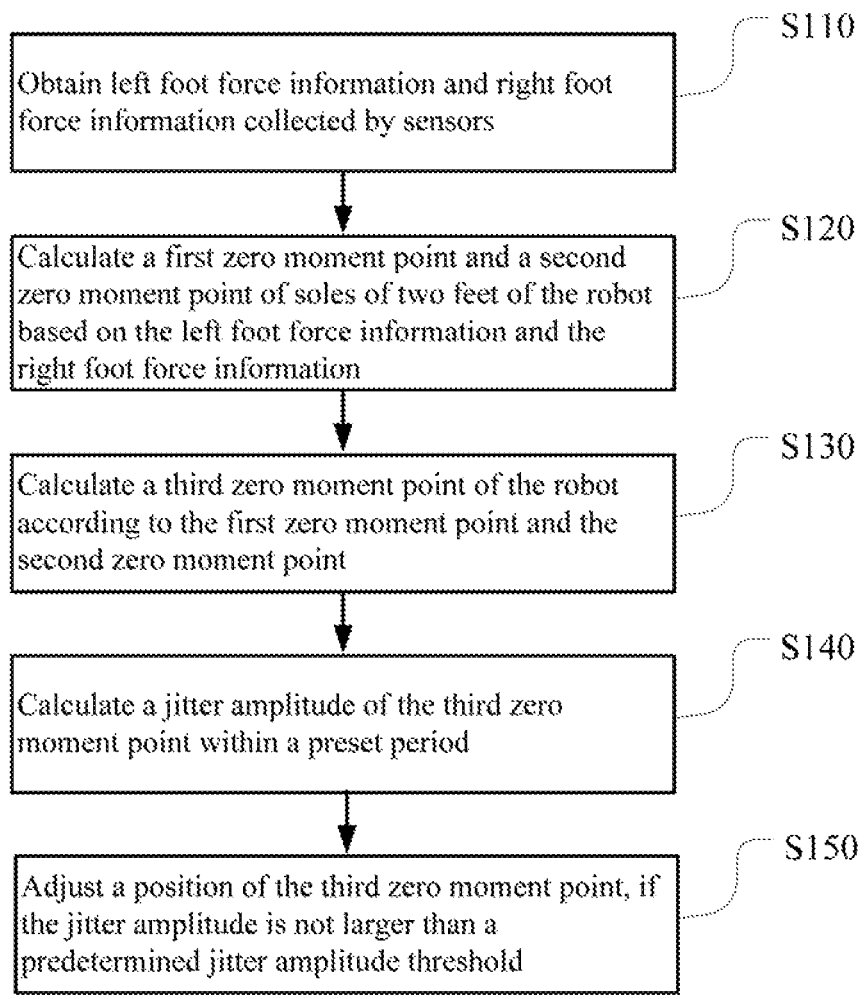
FIG. 1 is a flow chart of a zero moment point jitter processing method according to an embodiment of the present disclosure.
Figure 7:
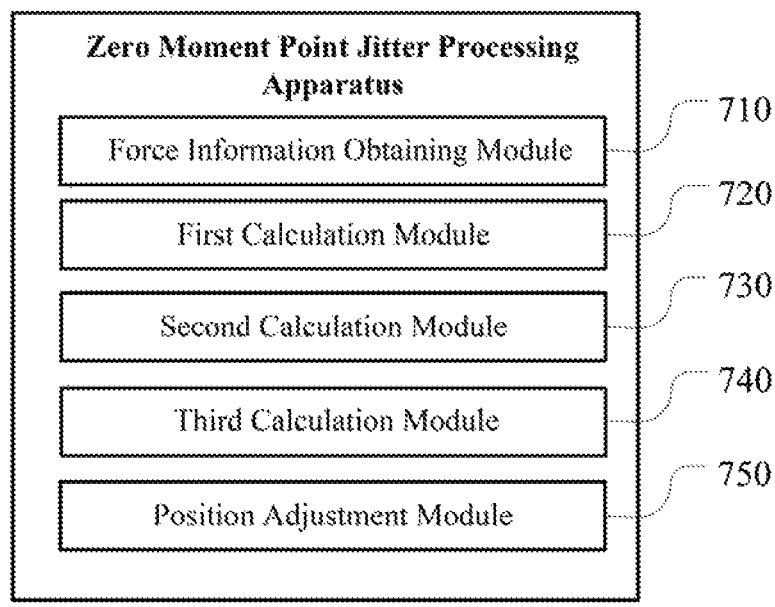
FIG. 7 is a schematic block diagram of a zero moment point jitter processing apparatus according to an embodiment of the present disclosure.
Figure 8:
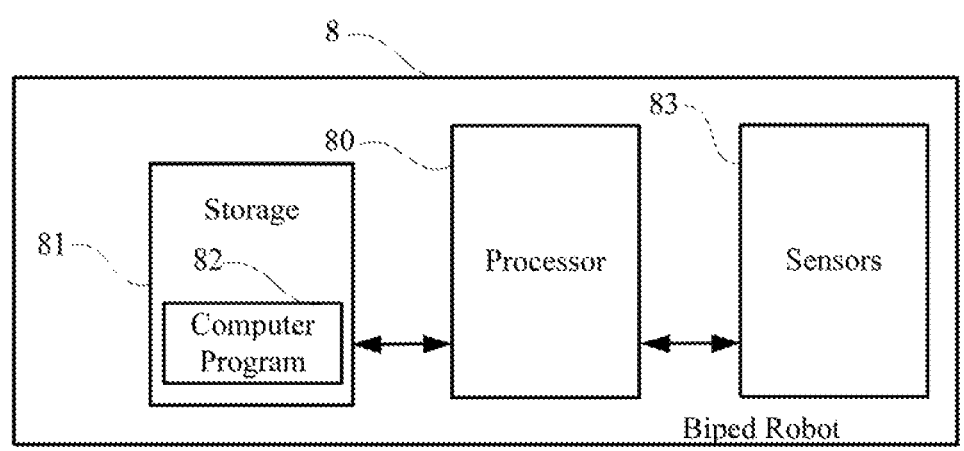
FIG. 8 is a schematic block diagram of a biped robot according to an embodiment of the present disclosure.

FIG. 1 is a flow chart of a zero moment point jitter processing method according to an embodiment of the present disclosure. In this embodiment, a zero moment point jitter processing method for a robot is provided. In which, the robot has two feet and two legs (i.e., a left foot and a right foot), where one of the two legs connects one of the two feet and the other of the two legs connects the other of the two feet. The method is a computer-implemented method executable for a processor, which may be implemented through and applied to a zero moment point jitter processing apparatus as shown in FIG. 7 or a biped robot as shown in FIG. 8. As shown in FIG. 1, the method includes the following steps.

S110: obtaining left foot force information and right foot force information collected by sensors, where the sensors are disposed at a position connecting each of the two feet and the connected leg.

S120: calculating a first zero moment point and a second zero moment point of soles of two feet of the robot based on the left foot force information and the right foot force information.

S130: calculating a third zero moment point of the robot according to the first zero moment point and the second zero moment point.

S140: calculating a jitter amplitude of the third zero moment point within a preset period, where the period is a period of a jitter curve obtained by fitting historical data.

S150: adjusting a position of the third zero moment point, if the jitter amplitude is not larger than a predetermined jitter amplitude threshold, where the jitter amplitude threshold is an amplitude of the jitter curve.

The above steps will be described in detail below.

In step S110, the left foot force (i.e., the force acting on the left foot) information and the right foot force (i.e., the force acting on the right foot) information that are collected by sensors of the robot is obtained, where the sensors are disposed at a position connecting each of the two feet and the connected leg.

Figure 2:
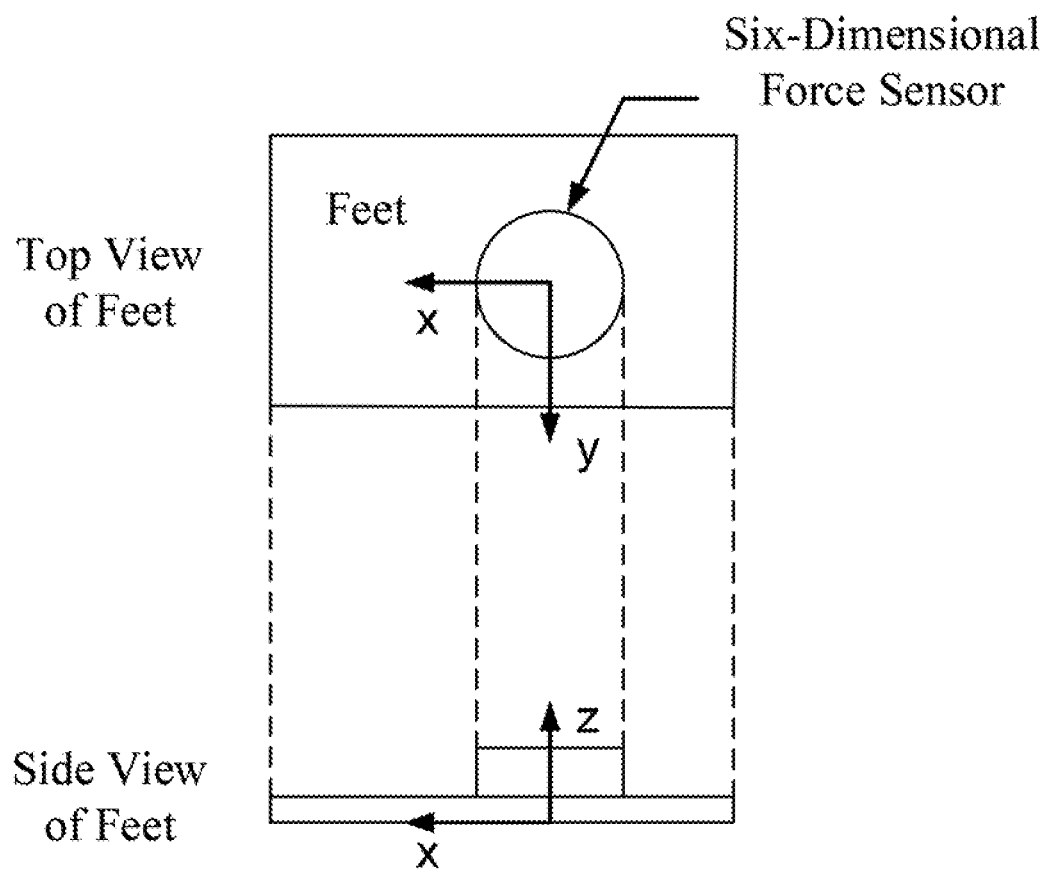
FIG. 2 is a schematic diagram of an example of a coordinate system of a plantar of a robot according to an embodiment of the present disclosure.

FIG. 2 is a schematic diagram of an example of a coordinate system of a plantar of a robot according to an embodiment of the present disclosure. As shown in FIG. 2, in this embodiment, the sensors can be six-dimensional force sensors capable of simultaneously detecting the left foot force information and the right foot force information of the three-dimensional space in the coordinate system of the plantar shown in FIG. 2. The left foot force information includes force components and moment components in three coordinate axis directions, and the right foot force information also includes force components and moment components in three coordinate axis directions. The left foot force information and the right foot force information of the feet of the biped robot are transmitted to a computing device of the robot so as to calculate the zero moment points of the left leg and the right leg. It needs to use twelve components including a force component and a moment component in an x-axis direction, a force component and a moment component in a y-axis direction, and a force component and a moment component in a z-axis direction, of the left foot force information and the right foot force information, respectively.

In step S120, the first zero moment point and the second zero moment point of soles of two feet of the robot are calculated based on the left foot fore information and the right foot force information.

It can be understood that, the zero moment point (ZMP) refers to a point on a ground, and the moment component on the ground of the sole rotating around the point in response to the reaction force of the ground that acts on the sole is zero. The point is an important index for determining the dynamic and stable movement of a humanoid robot. If the ZMP is within the range of the foot, the robot can perform stable movements such as standing and walking.

In one embodiment, the step of calculating the first zero moment point and the second zero moment point on the soles of the two fees of the biped robot based on the left foot force information and the right foot force information, respectively, includes:

In this embodiment, the first zero moment point in the first coordinate system can be determined based on the formulas of:

$$p_{lx}=(-\tau_{ly}-f_{lx}\times d)/f_{lz};\quad\text{(formula 1)}$$

$$p_{ly}=(-\tau_{lx}-f_{ly}\times d)/f_{lz};\text{ and}\quad\text{(formula 2)}$$

$$p_{l}=[p_{lx}p_{ly}0]^{T};\quad\text{(formula 3)}$$

where, d is a distance from a six-dimensional force sensor of a left foot to a sole of a left leg; $p_{lx}$ is a coordinate of the first zero moment point on the x-axis of the first coordinate system, and $p_{ly}$ is a coordinate of the first zero moment point on the y-axis of the first coordinate system; $f_{lx}$ is a component of force information of the left leg on the x-axis of the first coordinate system, $f_{ly}$ is a component of force information of the left leg on the y-axis of the first coordinate system, and $f_{lz}$ is a component of force information of the left leg on the z-axis of the first coordinate system, $\tau_{lx}$ is a moment component of the force information of the left leg on the x-axis of the first coordinate system, and $\tau_{ly}$ is a moment component of the force information of the left leg on the y-axis of the first coordinate system; and $p_l$ is the first zero moment point in the first coordinate system, and the first coordinate system is a coordinate system of a plantar the left leg of the robot.

In this embodiment, the second zero moment point in a second coordinate system can be determined based on the formulas of:

$$p_{rx}=(-\tau_{ry}-f_{rx}\times d)/f_{rz};\quad\text{(formula 4)}$$

$$p_{ry}=(-\tau_{rx}-f_{ry}\times d)/f_{rz};\text{ and}\quad\text{(formula 5)}$$

$$p_{r}=[p_{rx}p_{ry}0]^{T};\quad\text{(formula 6)}$$

where, d is a distance from a six-dimensional force sensor of a right foot to a sole of a right leg; $p_{rx}$ is a coordinate of the second zero moment point on the x-axis of the second coordinate system, and $p_{ry}$ is a coordinate of the second zero moment point on the y-axis of the second coordinate system; $f_{rx}$ is a component of force information of the right leg on the x-axis of the second coordinate system, $f_{ry}$ is a component of force information of the right leg on the y-axis of the second coordinate system, and $f_{rz}$ is a component of force information of the right leg on the z-axis of the second coordinate system, $\tau_{rx}$ is a moment component of the force information of the right leg on the x-axis of the second coordinate system, and $\tau_{ry}$ is a moment component of the force information of the right leg on the y-axis of the second coordinate system; and $p_r$ is the second zero moment point in the second coordinate system, and the second coordinate system is a coordinate system of a plantar the right leg of the robot.

Figure 3:
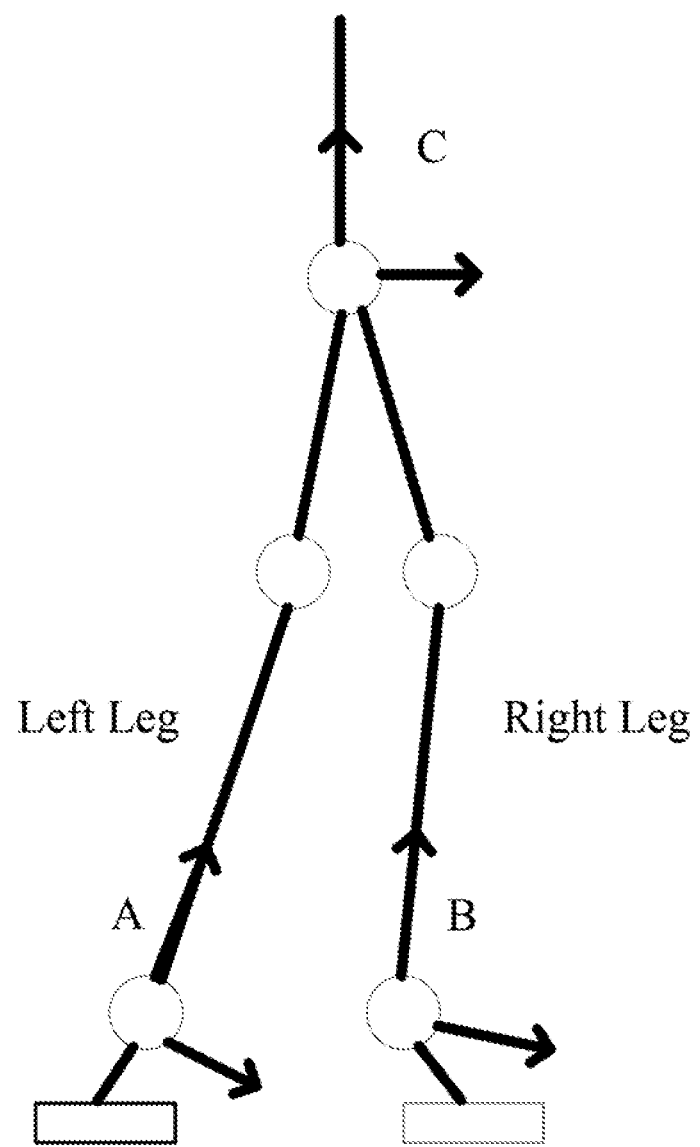
FIG. 3 is a schematic diagram of an example of a robot before jittering according to an embodiment of the present disclosure.
Figure 4:
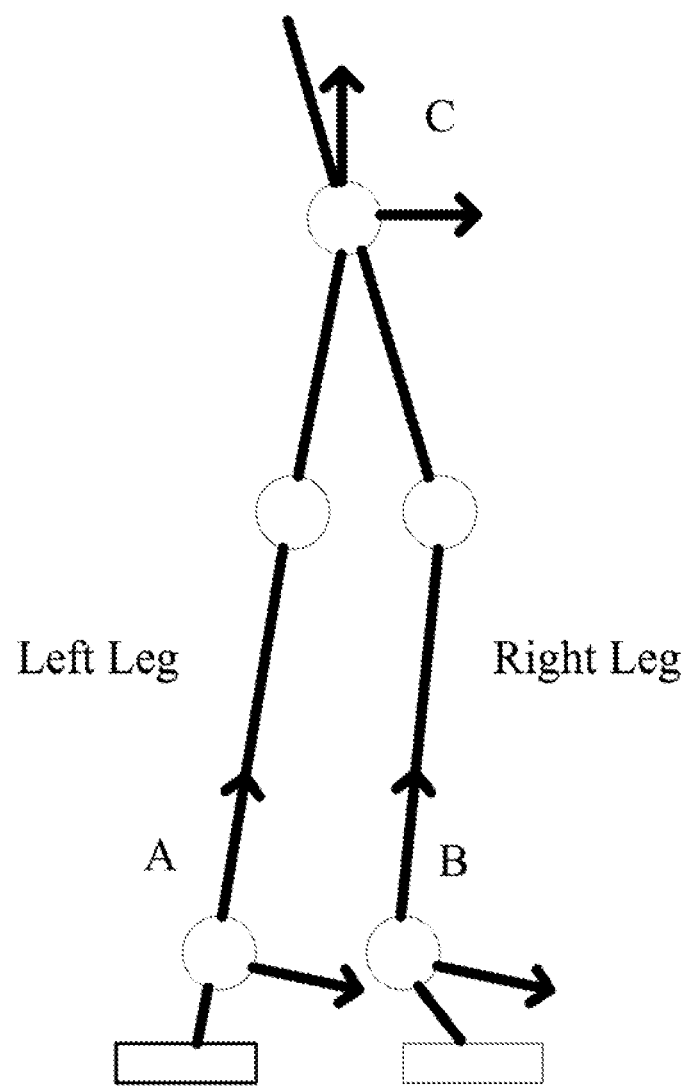
FIG. 4 is a schematic diagram of an example of a robot after jittering according to an embodiment of the present disclosure.

FIG. 3 is a schematic diagram of an example of a robot before jittering according to an embodiment of the present disclosure. As shown in FIG. 3, the coordinate system of the plantar of the left leg of the robot (i.e., the first coordinate system) is a coordinate system A, and the coordinate system of the plantar of the right leg of the robot (i.e., the second coordinate system) is a coordinate system B, and a coordinate system of a body of the robot (i.e., the third coordinate system) is a coordinate system C. FIG. 4 is a schematic diagram of an example of a robot after jittering according to an embodiment of the present disclosure. In the case of the vibration of the left leg as an example, when the left leg of the robot vibrates, the torso of the robot easily loses balance, and the upper body of the robot will be tilted as shown in FIG. 4.

At this time, the first zero moment point and the second zero moment point of the soles of the two feet of the biped robot are calculated based on the left foot force information and the right foot force information, and the result of the calculation is fed back to the computing device of the robot. The computing device of the robot calculates the third zero moment point with respect to a mass center of the robot according to the first zero moment point and the second zero moment point.

In step S130, a third zero moment point of the robot is calculated according to the first zero moment point and the second zero moment point.

In one embodiment, the third zero moment point in the third coordinate system can be calculated based on the formulas of:

$$p_{bx} = \frac{(p_{rx} - l_x)f_{rz} + (p_{lx} - l_x)f_{lz}}{f_{rz} + f_{lz}};$$ (formula 7)

$$p_{by} = \frac{(p_{ry} - l_y)f_{rz} + (p_{ly} - l_y)f_{lz}}{f_{rz} + f_{lz}}; \text{ and}$$ (formula 8)

$$p_b = [\begin{matrix} p_{bx} & p_{by} & 0 \end{matrix}]^T;$$ (formula 9)

where, $p_{bx}$ is the coordinate of the third zero moment point on the x-axis of the third coordinate system, and $p_{by}$ is the coordinate of the third zero moment point on the y-axis of the third coordinate system; $f_{ls}$ is the component of the force information of the left foot on the z-axis in the first coordinate system, and $f_{rz}$ is the component of the force of the force information of the right foot on the z-axis in the second coordinate system; $p_{lx}$ is the coordinate of the first zero moment point on the x axis of the first coordinate system, and $p_{ly}$ is the coordinate of the first zero moment point on the y axis of the first coordinate system; $p_{rx}$ is the coordinate of the second zero moment point on the x axis of the second coordinate system, and $p_{ry}$ is the coordinate of the second zero moment point on the y axis of the second coordinate system; $l_x$ is a distance component from the six-dimensional force sensor of the left foot to a coordinate origin of the robot on the x-axis of the third coordinate system, $l_y$ is a distance component from the six-dimensional force sensor of the right foot to the coordinate origin of the robot on the y-axis of the third coordinate system, $p_b$ is the third zero moment point of the third coordinate system, where the third coordinate system is a coordinate system of a body of the robot.

Figure 5:
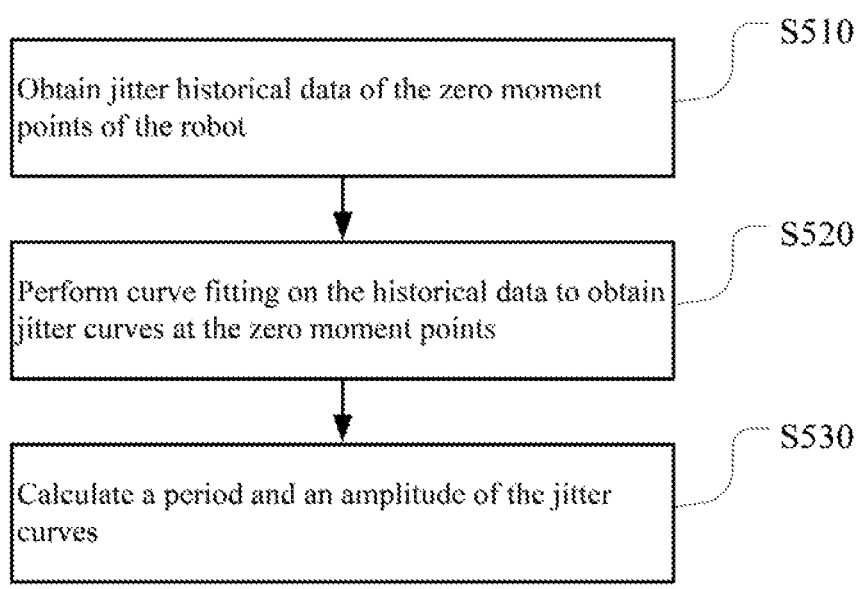
FIG. 5 is a flow chart of an example of a calculation process of a period and amplitude of a jitter curve according to one embodiment.

FIG. 5 is a flow chart of an example of a calculation process of a period and amplitude of a jitter curve according to an embodiment of the present disclosure. As shown in FIG. 5, in this embodiment, before step S140, the method further includes the following steps.

S510: obtaining jitter historical data of the zero moment points of the robot.

S520: performing curve fitting on the historical data to obtain jitter curves at the zero moment points.

S530: calculating a period and an amplitude of the jitter curves.

The above steps will be described in detail below.

In step S510, the jitter historical data of the zero moment point of the robot can be obtained from the storage device of the robot.

In step S520 and step S530, the jitter of the zero moment point of the robot is a sine-like periodic oscillation. Therefore, it performs the curve fitting on the historical data so as to obtain the jitter curves of the zero moment points, and calculates the period and the amplitude of the jitter curves so as to be used in the subsequent step S140 and step S150.

In step S140, the jitter amplitude of the third zero moment point within the preset period is calculated.

Figure 6:
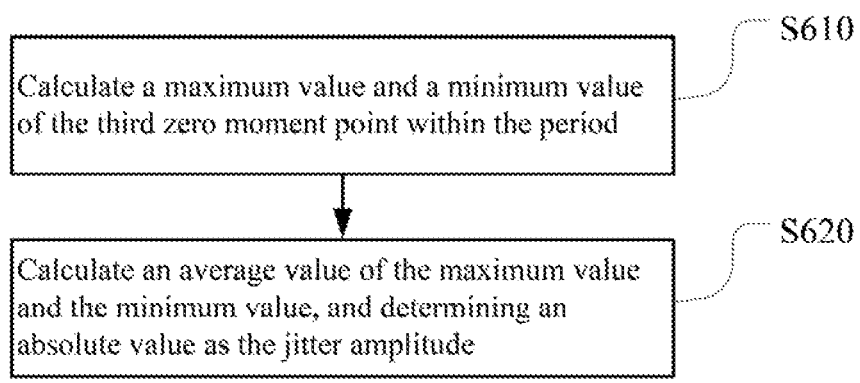
FIG. 6 is a flow chart of an example of step 140 of the method of FIG. 1 according to an embodiment of the present disclosure.

FIG. 6 is a flow chart of an example of step 140 of the method of FIG. 1 according to an embodiment of the present disclosure. As shown in FIG. 6, in this embodiment, step S140 includes the following steps:

S610: calculating a maximum value and a minimum value of the third zero moment point within the period; and S620: calculating an average value of the maximum value and the minimum value, and determining an absolute value as the jitter amplitude.

In step S150, the position of the third zero moment point is adjusted, if the jitter amplitude is not larger than the predetermined jitter amplitude threshold.

In this embodiment, an average value of the maximum value and the minimum value can be calculated first, and then the position of the third zero moment point can be adjusted based on the average value.

The average value can be an arithmetic average value, a geometric average value, a harmonic average value, a squared average value, or other average value of the maximum value and the minimum value, which is not limited in the present disclosure.

With this adjustment, the zero moment point jitter within a certain amplitude which caused by the robot's own system oscillation can be eliminated, thereby effectively improving the stability of the biped robot.

In one embodiment, when the jitter amplitude is larger than the predetermined jitter amplitude threshold, the third zero moment point is kept unchanged.

It can be understood that, when the jitter amplitude is larger than the predetermined jitter amplitude threshold, it indicates that the zero moment point at this time is the data that needs to be obtained during the movement of the robot, and no further adjustment is required.

In summary, compared with the prior art, the beneficial effects of this embodiment are that, after obtaining left foot force information and right foot force information collected by a plurality of sensors; calculating a first zero moment point and a second zero moment point of soles of two feet of the biped robot based on the left foot force information and the right foot force information; calculating a third zero moment point of the biped robot according to the first zero moment point and the second zero moment point; calculating a jitter amplitude of the third zero moment point within a preset period; determining a relationship between the jitter amplitude and the preset jitter amplitude threshold; and adjusting a position of the third zero moment point, if the jitter amplitude is not larger than a predetermined jitter amplitude threshold; the biped robot can eliminate zero moment point jitters within a certain amplitude which is caused by its own system oscillation during standing, walking or other movement, thereby effectively improving the stability of the biped robot.

FIG. 7 is a schematic block diagram of a zero moment point jitter processing apparatus according to an embodiment of the present disclosure. A zero moment point jitter processing apparatus for a robot is provided. In which, the robot has two feet and two legs (i.e., a left foot and a right foot), where one of the two legs connects one of the two feet and the other of the two legs connects the other of the two feet. As shown in FIG. 7, the apparatus may include:

a force information obtaining module 710 configured to obtain left foot force information and right foot force information collected by a plurality of sensors, where the sensors are disposed at a position connecting each of the two feet and the connected leg;

a first calculation module 720 configured to calculate a first zero moment point and a second zero moment point of soles of two feet of the robot based on the left foot force information and the right foot force information;

a second calculation module 730 configured to calculate a third zero moment point of the robot according to the first zero moment point and the second zero moment point;

a third calculation module 740 configured to calculate a jitter amplitude of the third zero moment point within a preset period, where the period is a period of a jitter curve obtained by fitting historical data; and a position adjustment module 750 configured to adjust a position of the third zero moment point if the jitter amplitude is not larger than a predetermined jitter amplitude threshold, where the jitter amplitude threshold is an amplitude of the jitter curve.

Furthermore, the apparatus can further include:

a historical data obtaining module configured to obtain jitter historical data at the zero moment points of the robot;

a curve fitting module configured to perform curve fitting on the historical data to obtain jitter curves at the zero moment points; and a parameter calculation module configured to calculate a period and an amplitude of the jitter curves.

Furthermore, the position adjustment module 750 can include:

a maximum value and minimum value calculation unit configured to calculate a maximum value and a minimum value of the third zero moment point within the period; and an average value calculation unit configured to calculate an average value of the maximum value and the minimum value, and performing a positional adjustment on the third zero moment point based on the average value.

Furthermore, the apparatus can further include:

a zero moment point keeping module is configured to keep the third zero moment point unchanged if the jitter amplitude is larger than a predetermined jitter amplitude threshold.

In this embodiment, each of the above-mentioned modules/units is implemented in the form of software, which can be computer program(s) stored in a memory of the zero moment point jitter processing apparatus and executable on a processor of the zero moment point jitter processing apparatus. In other embodiments, each of the above-mentioned modules/units may be implemented in the form of hardware (e.g., a circuit of the zero moment point jitter processing apparatus which is coupled to the processor of the zero moment point jitter processing apparatus) or a combination of hardware and software (e.g., a circuit with a single chip microcomputer).

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 8 is a schematic block diagram of a biped robot according to an embodiment of the present disclosure. A biped robot is provided. In which, the biped robot has two feet and two legs (i.e., a left foot and a right foot), where one of the two legs connects one of the two feet and the other of the two legs connects the other of the two feet. As shown in FIG. 8, in this embodiment, a biped robot 8 includes a processor 80, a storage 81, a computer program 82 stored in the storage 81 and executable on the processor 80, and sensors 83. When executing (instructions in) the computer program 82, the processor 80 implements the steps in the above-mentioned embodiments of the zero moment point jitter processing method, for example, steps S110-S150 shown in FIG. 1. Alternatively, when the processor 80 executes the (instructions in) computer program 82, the functions of each module/unit in the above-mentioned device embodiments, for example, the functions of the modules 710-750 shown in FIG. 7 are implemented. The sensors 83 are six-dimensional force sensors.

Exemplarily, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the robot 8.

It can be understood by those skilled in the art that FIG. 8 is merely an example of the robot 8 and does not constitute a limitation on the robot 8, and may include more or fewer components than those shown in the figure, or a combination of some components or different components. For example, the robot 8 may further include an input/output device, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the robot 8, for example, a hard disk or a memory of the robot 8. The storage 81 may also be an external storage device of the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store the computer program 82 and other programs and data required by the robot 8. The storage 81 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the pans which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented zero moment point jitter processing method, comprising:
    providing a robot comprising a processor, a plurality of sensors electrically coupled to the processor, two feet, and two legs connected to the two feet respectively, wherein the plurality of sensors are disposed at a position connecting each of the two feet and the connected leg;
    obtaining, by the plurality of sensors, left foot force information and right foot force information;
    calculating, by the processor, a first zero moment point and a second zero moment point of soles of two feet of the robot based on the left foot force information and the right foot force information;
    calculating, by the processor, a third zero moment point of the robot according to the first zero moment point and the second zero moment point;
    calculating, by the processor, a jitter amplitude of the third zero moment point within a preset period, wherein the period is a period of a jitter curve obtained by fitting historical data; and
    adjusting, by the processor, a position of the third zero moment point in response to the jitter amplitude being not larger than a predetermined jitter amplitude threshold, and controlling the robot to move based on the adjusted position of the third zero moment point, wherein the jitter amplitude threshold is an amplitude of the jitter curve.

2. The method of claim 1, wherein before the step of calculating, by the processor, the jitter amplitude of the third zero moment point within the preset period comprises:
    obtaining, by the processor, jitter historical data of the zero moment points of the robot;
    performing, by the processor, curve fitting on the historical data to obtain jitter curves at the zero moment points; and
    calculating, by the processor, a period and an amplitude of the jitter curves.

3. The method of claim 1, wherein the step of adjusting, by the processor, the position of the third zero moment point comprises:

calculating, by the processor, a maximum value and a minimum value of the third zero moment point within the period; and calculating, by the processor, an average value of the maximum value and the minimum value, and performing a positional adjustment on the third zero moment point based on the average value.

4. The method of claim 1, wherein after the step of calculating, by the processor, the jitter amplitude of the third zero moment point within the preset period comprises:

keeping, by the processor, the third zero moment point unchanged in response to the jitter amplitude being larger than a predetermined jitter amplitude threshold.

5. The method of claim 1, wherein the step of calculating, by the processor, the first zero moment point and the second zero moment point of the soles of the two feet of the robot based on the left foot force information and the right foot force information comprises:

determining, by the processor, the first zero moment point in the first coordinate system based on the formulas of $$P_{lx} = (-\tau_{ly} - f_{lx} \times d)/f_{lz};$$

$$p_{ly} = (-t_{lx} - f_{ly} \times d)/f_{lx}; \text{ and}$$

$$P_l = [\, P_{lx} \quad P_{iy} \quad 0\,]^t;$$

where, d is a distance from a six-dimensional force sensor of a left foot to a sole of a left leg; $p_{lx}$ is a coordinate of the first zero moment point on the x-axis of the first coordinate system, and $p_{ly}$ is a coordinate of the first zero moment point on the y-axis of the first coordinate system; $f_{lx}$ is a component of force information of the left leg on the x-axis of the first coordinate system, $f_{ly}$ is a component of force information of the left leg on the y-axis of the first coordinate system, and $f_{lz}$ is a component of force information of the left leg on the z-axis of the first coordinate system, $\tau_{lx}$ is a moment component of the force information of the left leg on the x-axis of the first coordinate system, and $\tau_{ly}$ is a moment component of the force information of the left leg on the y-axis of the first coordinate system; and $p_l$ is the first zero moment point in the first coordinate system, and the first coordinate system is a coordinate system of a plantar the left leg of the robot.

6. The method of claim 1, wherein the step of calculating, by the processor, the first zero moment point and the second zero moment point of the soles of the two feet of the robot based on the left foot force information and the right foot force information comprises:

determining, by the processor, the second zero moment point in a second coordinate system based on the formulas of:

$$p_{rx}=(-\tau_{ry}-f_{rx}\times d)/f_{rz};$$

$$p_{ry}=(-\tau_{rx}-f_{ry}\times d)/f_{rz}; \text{ and}$$

$$p_r=[p_{rx}p_{ry}0]^T;$$

where, d is a distance from a six-dimensional force sensor of a right foot to a sole of a right leg $p_{rx}$ is a coordinate of the second zero moment point on the x-axis of the second coordinate system, and $p_{ry}$ is a coordinate of the second zero moment point on the y-axis of the second coordinate system; $f_{rx}$ is a component of force information of the right leg on the x-axis of the second coordinate system, $f_{ry}$ is a component of force information of the right leg on the y-axis of the second coordinate system, and $f_{rx}$ is a component of force information of the right leg on the z-axis of the second coordinate system, $\tau_{rx}$ is a moment component of the force information of the right leg on the x-axis of the second coordinate system, and $\tau_{xy}$ is a moment component of the force information of the right leg on the y-axis of the second coordinate system; and $p_r$ is the second zero moment point in the second coordinate system, and the second coordinate system is a coordinate system of a plantar the right leg of the robot.

7. The method of claim 1, wherein the step of calculating, by the processor, the third zero moment point of the robot according to the first zero moment point and the second zero moment point comprises:

calculating, by the processor, the third zero moment point in the third coordinate system based on the formulas of:

$$p_{bx} = \frac{(p_{rx}-l_x)f_{rz}+(p_{lx}-l_x)f_{lz}}{f_{rz}+f_{lz}};$$

$$p_{by} = \frac{(p_{ry}-l_y)f_{rz}+(p_{ly}-l_y)f_{lz}}{f_{rz}+f_{lz}}; \text{ and}$$

$$p_b = [\, p_{bx} \quad p_{by} \quad 0\,]^T;$$

where, $p_{bx}$ is the coordinate of the third zero moment point on the x-axis of the third coordinate system, and $p_{by}$ is the coordinate of the third zero moment point on the y-axis of the third coordinate system; $f_{lz}$ is the component of the force information of the left foot on the z-axis in the first coordinate system, and $f_{rz}$ is the component of the force of the force information of the right tot on the z-axis in the second coordinate system; $p_{lx}$ is the coordinate of the first zero moment point on the x axis of the first coordinate system, and $p_{ly}$ is the coordinate of the first zero moment point m the y axis of the first coordinate system; $p_{rx}$ is the coordinate of the second zero moment point on the x axis of the second coordinate system, and $p_{ry}$ is the coordinate of the second zero moment point on the y axis of the second coordinate system; $l_x$ is a distance component from the six-dimensional force sensor of the left foot to a coordinate origin of the robot on the x-axis of the third coordinate system, $l_y$ is a distance component from the six-dimensional force sensor of the right foot to the coordinate origin of the robot the y-axis of the third coordinate system, $p_b$ is the third zero moment point of the third coordinate system, where the third coordinate system is a coordinate system of a body of the robot.

8. A zero moment point jitter processing apparatus for a robot comprising two feet and two legs and the two legs connecting to the two feet, respectively, comprising:

a force information obtaining module configured to obtain left foot force information and right foot force information collected by a plurality of sensors, wherein the sensors are disposed at a position connecting each of the two feet and the connected leg;

a first calculation module configured to calculate a first zero moment point and a second zero moment point of soles of two feet of the robot based on the left foot force information and the right foot force information;

a second calculation module configured to calculate a third zero moment point of the robot according to the first zero moment point and the second zero moment point;

a third calculation module configured to calculate a jitter amplitude of the third zero moment point within a preset period, wherein the period is a period of a jitter curve obtained by fitting historical data; and a position adjustment module configured to adjust a position of the third zero moment point in response to the jitter amplitude being not larger than a predetermined jitter amplitude threshold, and control the robot to move based on the adjusted position of the third zero moment point, wherein the jitter amplitude threshold is an amplitude of the jitter curve.

9. A robot, comprising
two feet;
two legs connecting to the two feet, respectively;
a plurality of sensors;
a memory;
a processor; and
one or more computer programs stored in the memory and executable on the processor,
wherein the one or more computer programs comprise:
instructions for obtaining left foot force information and right foot force information collected by the sensors, wherein the sensors are disposed at a position connecting each of the two feet and the connected leg;
instructions for calculating a first zero moment point and a second zero moment point of soles of two feet of the robot based on the left foot force information and the right foot force information;
instructions for calculating a third zero moment point of the robot according to the first zero moment point and the second zero moment point;
instructions for calculating a jitter amplitude of the third zero moment point within a preset period, wherein the period is a period of a jitter curve obtained by fitting historical data; and
instructions for adjusting a position of the third zero moment point in response to the jitter amplitude being not larger than a predetermined jitter amplitude threshold, and controlling the robot to move based on the adjusted position of the third zero moment point, wherein the jitter amplitude threshold is an amplitude of the jitter curve.

10. The robot of claim 9, wherein the one or more computer programs further comprise:
instructions for obtaining jitter historical data of the zero moment points of the robot;
instructions for performing curve fitting on the historical data to obtain jitter curves at the zero moment points; and
instructions for calculating a period and an amplitude of the jitter curves.

11. The robot of claim 9, wherein the instructions for adjusting the position of the third zero moment point comprise:
instructions for calculating a maximum value and a minimum value of the third zero moment point within the period; and
instructions for calculating an average value of the maximum value and the minimum value, and performing a positional adjustment on the third zero moment point based on the average value.

12. The robot of claim 9, wherein the one or more computer programs further comprise:

instructions for keeping the third zero moment point unchanged in response to the jitter amplitude being larger than a predetermined jitter amplitude threshold.

13. The robot of claim 9, wherein the instructions for calculating the first zero moment point and the second zero moment point of the soles of the two feet of the robot based on the left foot force information and the right foot force information comprise:
instructions for determining the first zero moment point in the first coordinate system based on the formulas of:

$p_{lx}=(-\tau_{ly}-f_{lx} \times d)/f_{lz};$ $p_{ly}=(-\tau_{lx}-f_{ly} \times d)/f_{lz};$ and $p_l=[p_{lx} p_{ly} 0]^T;$ where, d is a distance from a six-dimensional force sensor of a left foot to a sole of a left leg; $p_{lx}$ is a coordinate of the first zero moment point on the x-axis of the first coordinate system, and $p_{ly}$ is a coordinate of the first zero moment point on the y-axis of the first coordinate system; $f_{lx}$ is a component of force information of the left leg on the x-axis of the first coordinate system, $f_{ly}$ is a component of force information of the left leg on the y-axis of the first coordinate system, and $f_{lx}$ is a component of force information of the left leg on the z-axis of the first coordinate system, $\tau_{lx}$ is a moment component of the force information of the left leg on the x-axis of the first coordinate system, and $\tau_{ly}$ is a moment component of the force information of the left leg on the y-axis of the first coordinate system; and $p_l$ is the first zero moment point in the first coordinate system, and the first coordinate system is a coordinate system of a plantar the left leg of the robot.

14. The robot of claim 9, wherein the instructions for calculating the first zero moment point and the second zero moment point of the soles of the two feet of the robot based on the left foot force information and the right foot force information comprise:
instructions for determining the second zero moment point in a second coordinate system based on the formulas of:

$p_{rx}=(-\tau_{ly}-f_{rx} \times d)/f_{rz};$ $p_{ry}=(-\tau_{yx}-f_{ry} \times d)/f_{rz};$ and $p_r=[p_{rx} p_{ry} 0]^T;$ where, d is a distance from a six-dimensional force sensor of a right foot to a sole of a right leg; $p_{rx}$ is a coordinate of the second zero moment point on the x-axis of the second coordinate system, and $p_{ry}$ is a coordinate of the second zero moment point on the y-axis of the second coordinate system; $f_{rx}$ is a component of force information of the right leg on the x-axis of the second coordinate system, $f_{ry}$ is a component of force information of the right leg on the y-axis of the second coordinate system, and $f_{yx}$ is a component of force information of the right leg on the z-axis of the second coordinate system, $\tau_{rx}$ is a moment component of the force information of the right leg on the x-axis of the second coordinate system, and $\tau_{ry}$ is a moment component of the force information of the right leg on the y-axis of the second coordinate system; and $p_r$ is the second zero moment point in the second coordinate system, and the second coordinate system is a coordinate system of a plantar the right leg of the robot.

15. The robot of claim 9, wherein the instructions for calculating the third zero moment point of the robot according to the first zero moment point and the second zero moment point comprise:

instructions for calculating the third zero moment point in the third coordinate system based on the formulas of:

$$p_{bx} = \frac{(p_{rx} - l_x)f_{rz} + (p_{lx} - l_x)f_{lz}}{f_{rz} + f_{lz}};$$

$$p_{by} = \frac{(p_{ry} - l_y)f_{rz} + (p_{ly} - l_y)f_{lz}}{f_{rz} + f_{lz}}; \text{ and}$$

$$p_b = [\, p_{bx} \quad p_{by} \quad 0 \,]^T;$$

where, $p_{bx}$ is the coordinate of the third zero moment point on the x-axis of the third coordinate system, and $p_{by}$ is the coordinate of the third zero moment point on the y-axis of the third coordinate system; $f_{lz}$ is the component of the force information of the left foot on the z-axis in the first coordinate system, and $f_{rz}$ is the component of the force of the force information of the right foot on the z-axis in the second coordinate system; $p_{lx}$ is the coordinate of the first zero moment point on the x axis of the first coordinate system, and $p_{ly}$ is the coordinate of the first zero moment point on the y axis of the first coordinate system; $p_{rx}$ is the coordinate of the second zero moment point on the x axis of the second coordinate system, and $p_{ry}$ is the coordinate of the second zero moment point on the y axis of the second coordinate system; $l_x$ is a distance component from the six-dimensional force sensor of the left foot to a coordinate origin of the robot on the x-axis of the third coordinate system, $l_y$ is a distance component from the six-dimensional force sensor of the right foot to the coordinate origin of the robot the y-axis of the third coordinate system, $p_b$ is the third zero moment point of the third coordinate system, where the third coordinate system is a coordinate system of a body of the robot.

* * * * *